United States Patent
Zellner et al.

(10) Patent No.: US 11,537,999 B2
(45) Date of Patent: Dec. 27, 2022

(54) FACILITATION OF AUTOMATED PROPERTY MANAGEMENT

(71) Applicant: AT&T Intellectual Property I, L.P., Atlanta, GA (US)

(72) Inventors: Brittaney Zellner, Smyrna, GA (US); Sameena Khan, Peachtree Corners, GA (US); Ryan Schaub, Berkeley Lake, GA (US); Barrett Kreiner, Woodstock, GA (US); Ari Craine, Marietta, GA (US); Robert Koch, Peachtree Corners, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 109 days.

(21) Appl. No.: 16/850,656

(22) Filed: Apr. 16, 2020

(65) Prior Publication Data
US 2021/0326812 A1 Oct. 21, 2021

(51) Int. Cl.
G06Q 10/00 (2012.01)
G06Q 50/16 (2012.01)
H04W 4/38 (2018.01)

(52) U.S. Cl.
CPC .......... *G06Q 10/20* (2013.01); *G06Q 50/163* (2013.01); *H04W 4/38* (2018.02)

(58) Field of Classification Search
CPC ...... G06Q 10/20; G06Q 50/163; G06Q 50/16; H04W 4/38
See application file for complete search history.

(56) References Cited

U.S. PATENT DOCUMENTS

| 8,041,636 | B1 | 10/2011 | Hunter et al. |
| 8,874,592 | B2 | 10/2014 | Flake et al. |
| 8,963,806 | B1 | 2/2015 | Starner et al. |
| 9,916,693 | B1 | 3/2018 | Carr et al. |
| 9,928,657 | B2 | 3/2018 | De Pasquale |

(Continued)

FOREIGN PATENT DOCUMENTS

| CA | 2 739 793 A1 | 4/2010 |
| CA | 3047016 A1 * | 6/2018 ......... G06Q 10/0631 |

(Continued)

OTHER PUBLICATIONS

Grant Clauser "These Devices Can Prevent Major Home Damage and Save Your Money" The New York Times, Feb. 17, 2020, https://www.nytimes.com/2020/02/17/smarter-living/wirecutter/5-small-smart-devices-that-can-prevent-major-home-damage.html (Year: 2020).*

(Continued)

*Primary Examiner* — Gerardo Araque, Jr.
(74) *Attorney, Agent, or Firm* — Amin, Turocy & Watson, LLP

(57) ABSTRACT

This disclosure describes a solution to enable a real estate property to act as an independent entity. As such, it can detect needs for repairs and improvements, market itself, and earn revenue. The property can work independently or in concert with the owner and other parties in achieving these tasks. A real estate property can benefit from the use of a property management server that can be delegated by the owner of the property to manage the property either independently or in concert with the owner. This server can access and maintain data associated with assets of the property.

20 Claims, 10 Drawing Sheets

(56) References Cited

U.S. PATENT DOCUMENTS

| | | | |
|---|---|---|---|
| 10,043,211 B2* | 8/2018 | Joshi | G06Q 30/0631 |
| 10,129,508 B1* | 11/2018 | Hillman | G06Q 50/16 |
| 10,262,019 B1* | 4/2019 | Reiner | H04L 67/10 |
| 10,891,792 B1 | 1/2021 | Bhushan et al. | |
| 11,055,390 B1 | 7/2021 | Kragh | |
| 11,055,797 B1* | 7/2021 | Carone | G06K 9/00771 |
| 11,172,035 B2 | 11/2021 | Reineke et al. | |
| 11,182,224 B2 | 11/2021 | George et al. | |
| 11,334,725 B2 | 5/2022 | Hewitt et al. | |
| 2002/0199156 A1 | 12/2002 | Chess et al. | |
| 2008/0052201 A1 | 2/2008 | Bodin et al. | |
| 2008/0086508 A1 | 4/2008 | Ballew | |
| 2008/0310707 A1 | 12/2008 | Kansal et al. | |
| 2009/0095813 A1 | 4/2009 | Chang et al. | |
| 2010/0042531 A1 | 2/2010 | Heaton et al. | |
| 2012/0320033 A1 | 12/2012 | Papaefstathiou et al. | |
| 2013/0024327 A1* | 1/2013 | Nargizian | G06Q 20/28 705/27.1 |
| 2014/0164305 A1* | 6/2014 | Lynch | G06Q 30/0201 706/46 |
| 2014/0348365 A1 | 11/2014 | Edwards | |
| 2015/0012467 A1* | 1/2015 | Greystoke | G06Q 30/0619 706/12 |
| 2015/0036856 A1 | 2/2015 | Pruthi et al. | |
| 2015/0199754 A1* | 7/2015 | Greystoke | G06Q 30/0645 705/307 |
| 2016/0117646 A1* | 4/2016 | Lerick | G06Q 10/1097 705/7.21 |
| 2016/0163186 A1* | 6/2016 | Davidson | G06Q 10/0635 340/506 |
| 2017/0103440 A1 | 4/2017 | Xing et al. | |
| 2017/0287038 A1* | 10/2017 | Krasadakis | G06Q 30/0201 |
| 2017/0308802 A1* | 10/2017 | Ramsøy | H04L 63/0421 |
| 2018/0159838 A1 | 6/2018 | Dintenfass | |
| 2018/0173323 A1 | 6/2018 | Harvey et al. | |
| 2018/0239144 A1 | 8/2018 | Woods et al. | |
| 2018/0309806 A1 | 10/2018 | Huynh et al. | |
| 2019/0108603 A1* | 4/2019 | Waslander | G06Q 50/163 |
| 2019/0236732 A1 | 8/2019 | Speasl et al. | |
| 2019/0244267 A1 | 8/2019 | Rattner et al. | |
| 2019/0302460 A1 | 10/2019 | Kaul et al. | |
| 2019/0341050 A1 | 11/2019 | Diamant et al. | |
| 2020/0134753 A1* | 4/2020 | Vickers | G06K 9/00664 |
| 2020/0143270 A1* | 5/2020 | Yang | G06N 5/043 |
| 2021/0103452 A1* | 4/2021 | Pratt | G06F 16/243 |
| 2021/0216647 A1 | 7/2021 | Sarhaddar et al. | |

FOREIGN PATENT DOCUMENTS

| | | | |
|---|---|---|---|
| EP | 2 266 662 B1 | 8/2016 | |
| WO | WO-2016069746 A1 * | 5/2016 | G06Q 30/012 |

OTHER PUBLICATIONS

Anonymous "Virtual doormen on the go in new mobile app," Real Estate Weekly, vol. 57, (32), pp. A12(1), May 23, 2012 (Year: 2012).*

Mike Brassfield, "This Argumentative New Chat Bot Haggles With Comcast So You Don't Have To", Jan. 8, 2020, https://www.thepennyhoarder.com/save-money/how-trim-can-negotiate-your-comcast-bill/ (Year: 2020).*

Lewis et al., "Deal or no deal? Training AI bots to negotiate", Jun. 14, 2017, https://engineering.fb.com/2017/06/14/ml-applications/deal-or-no-deal-training-ai-bots-to-negotiate/ (Year: 2017).*

D. Brin, "Recruiting Bots Are Here to Stay: More companies use 'bots' to aid the hiring process," HRNews, pp. n/a, Dec. 16, 2016 (Year: 2016).*

Cathal McGloin, "Beyond the Virtual Assistant: Putting Bots to Work in Customer Service", Mar. 7, 2019, The Wayback Machine—https://web.archive.org/web/20190307220605/https://servisbot.com/beyond-the-virtual-assistant/ (Year: 2019).*

Non Final Office action received for U.S. Appl. No. 16/851,514 dated Jan. 29, 2021, 40 pages.

Zhang et al., "Time-Series Prediction of Environmental Noise for Urban IoT Based on Long Short-Term Memory Recurrent Neural Network." pp. 1-18. (Year: 2020).

Office Action dated Apr. 1, 2021 for U.S. Appl. No. 16/850,632, 42 pages.

Stipetic, et al. "7 Best Real Estate and Architecture Augmented Reality Apps." https://www.supersuperagency.com/blog/7-best-real-estate-architecture-augmented-reality-apps. Last Accessed Mar. 31, 2020. 10 pages.

Goldsmith, et al. "Augmented Reality Environmental Monitoring Using Wireless Sensor Networks." Proceedings of the 2008 12th International Conference on Information Visualisation (IV08), 2008. 7 pages.

Fukuda, et al. "An indoor thermal environment design system for renovation using augmented reality." Journal of Computational Design and Engineering 6 (2019) 179-188. 10 pages.

Natephra, et al. "Live data visualization of IoT sensors using Augmented Reality (AR) and BIM." 36th International Symposium on Automation and Robotics in Construction (ISARC 2019). 8 pages.

Non Final Office Action received for U.S. Appl. No. 16/851,541 dated Sep. 23, 2021, 43 pages.

Final Office Action received for U.S. Appl. No. 16/850,679 dated Jun. 24, 2022, 57 pages.

Gao et al., "EarEcho: Using Ear Canal Echo for Wearable Authentication", Proceedings of the ACM on Interactive, Mobile, Wearable and Ubiquitous Technologies, vol. 3, No. 3, Article 81, Sep. 2019, pp. 81.1-81.24.

Schneegass et al., "SkullConduct: Biometric user Identification on Eyewear Computers using Bone Conduction Through the Skull", CHI '16: Proceedings of the 2016 CHI Conference on Human Factors in Computing Systems, 2016, pp. 1379-1384.

Notice of Allowance received for U.S. Appl. No. 16/851,503 dated Sep. 14, 2022, 32 pages.

\* cited by examiner

FACILITATION OF AUTOMATED PROPERTY MANAGEMENT

TECHNICAL FIELD

This disclosure relates generally to facilitating property management. For example, this disclosure relates to facilitating automated property management via a property management server.

BACKGROUND

Property management is the operation, control, maintenance, and oversight of real estate and physical property. This can include residential, commercial, and land real estate. Management indicates the need of real estate to be cared for and monitored, with accountability for and attention its useful life and condition considered. This is much akin to the role of management in any business.

Property management is also the management of personal property, equipment, tooling, and physical capital assets that are acquired and used to build, repair, and maintain end item deliverables. Property management involves the processes, systems, and manpower required to manage the life cycle of all acquired property as defined above including acquisition, control, accountability, responsibility, maintenance, utilization, and disposition.

An owner of a single-family home, condominium, or multi-family building may engage the services of a professional property management company. The company will then advertise the rental property, handle tenant inquiries, screen applicants, select suitable candidates, draw up a lease agreement, conduct a move in inspection, move the tenant(s) into the property and collect rental income. The company can then coordinate any maintenance issues, supply the owner(s) with financial statements and any relevant information regarding the property, etc.

The above-described background relating to facilitation of automated property management is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
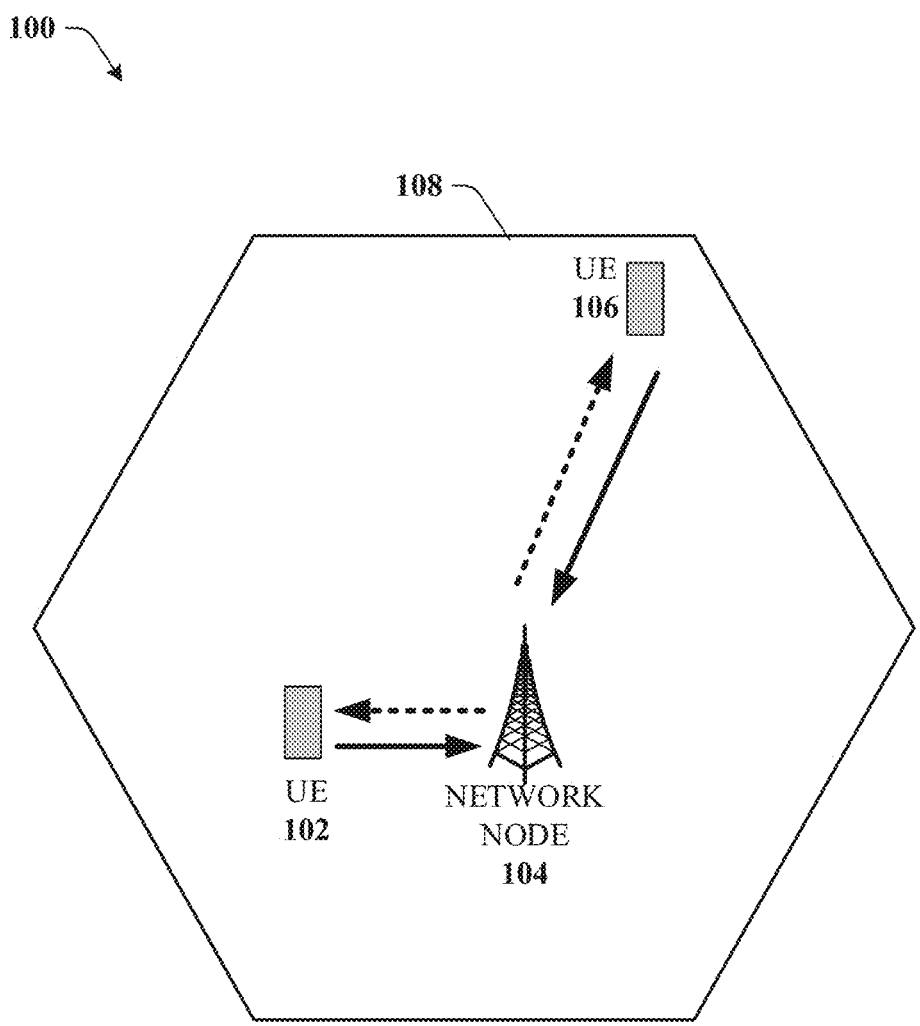
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate automated property management. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate automated property management. Facilitating automated property management can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

This disclosure describes a solution to enable a real estate property to act as an independent entity. As such, it is able to improve itself, detect needs for repairs and improvements, market itself, and earn revenue. The property can work independently or in concert with the owner and other parties in achieving these tasks. A real estate property can benefit from the use of a property management server that is delegated by the owner of the property to manage the property either independently or in concert with the owner. This server can access and maintain data associated with assets of the property.

The property's assets can include fixed physical assets of the property, such as the roof, a driveway, landscaping, walls, foundation, etc. Assets can also include semi-fixed physical assets, such as HVAC units, water heaters, generators, garage door openers, etc. The property's environment can also be considered to be an asset, and environmental assets data can include data from sensors such as humidity sensors, air flow sensors, motion sensors, and light sensors. The property management server can use data associated with the assets and other complementary data to employ data analysis and artificial intelligence techniques to manage the property. The property management server and asset data can reside locally, or be accessed via a network, such as the Internet.

While a residential house is used in the example, these techniques can also apply to other residential and commercial properties. Other types of assets can include technology assets, such as solar panels, electronic locks and doorbells, etc. Further, space assets can include spatial components that make up the property. They can be used by the owner or exchanged for value. For instance, a room or a garage can be used by the owner or made available to rent. Utility assets can include assets that can be used by the house or exchanged for value, such as internet access, solar power, computing power, and water. Fixed physical assets can include assets such as a roof, a driveway, landscaping, walls, and a foundation. For these assets, data can include: original date (date of installation), maintenance record (input by owner or service technician), current condition, historic condition, predicted future condition, value, usage, and/or predicted maintenance due date. The condition of the asset can be based on data that the asset records itself or that is collected by a sensor associated with the asset. For instance, a roof can be monitored by a camera and the images captured can be analyzed using AI techniques to predict the condition of the roof (e.g., by detecting an indentation in a shingle, damage can be recorded). Likewise, a size of a crack in the foundation can be tracked over time using camera images to identify slow changes over time. A predicted future condition can be made by applying aging formulas and using future usage level predictions and future environmental predictions, such as weather trends. A value can be assigned and changed over time based on depreciation formulas and usage and condition data. Usage data can be detected by sensors, such as a driveway sensor that detects weight.

Semi-fixed physical assets can include assets such as HVAC units, water heaters, generators, garage door openers. Technology assets can include solar panels, electronic locks and doorbells. For these assets, data can include: original date (date of installation), maintenance record (input by owner or service technician), current condition, historic condition, predicted future condition, value, usage, and/or predicted maintenance due date. The condition of the asset can be based on data that the asset records itself or that is collected by a sensor associated with the asset. For instance, an HVAC unit roof can run diagnostic software to detect its own condition. Likewise, a garage door opener can detect its own condition and amount of usage and predict its future condition by predicting its future usage based on usage trends and by using future environmental predictions, such as weather trends. A value can be assigned and changed over time based on depreciation formulas and usage and condition data.

The condition of the environment within the property can be represented as assets. For instance, air quality data, humidity data, air flow data, etc. can be represented. For these assets, data can include: current sensor levels, historic sensor levels, and/or predicted future sensor levels. Alternatively, or in addition, this data can be used to determine trends on the condition of other assets and predict future conditions of those assets.

Space assets can include spatial components that make up the property. these can include rooms, garages, rental units, etc. for these assets, data can include: dimensions, sub-assets, value, and/or usage. The dimension can define the size of the space. Sub-assets can include assets contained within or served by the space. For instance, the space can be a garage with a garage door opener and a standard door with a door lock. A value can be assigned and change over time based on depreciation formulas and usage and condition data. Usage can be detected by sensors such as motion and light sensors.

Utility assets can include assets that can be used by the house or exchanged for value, such as internet access, solar power, computing power, and water. For these assets, data can include: asset type, owner usage, available surplus, and/or predicted available surplus. Usage detectors can be a part of the utility system and record the amount of the utility that is used by the owner. The property management server can calculate a surplus amount of the utility (if any) on a periodic basis and can further predict future surplus levels using owner usage trends, and other factors such as predicted environmental factors.

The property management server can be delegated by the owner to have oversight of identifying maintenance needs for the house. In this case, for instance, a fixed asset can be the house's painted exterior. An exterior camera can record chipped paint and the property management server can detect it via image analysis and comparison of prior images. The property management server can use the predicted maintenance due date for repainting to create a maintenance task. The property management server can also include a bot that can act on behalf of the owner to seek and collect maintenance estimates over a network, such as the internet. The results for this and other identified maintenance tasks can be collected and presented to the owner. The owner can "approve" tasks, and the bot can schedule them with the maintenance providers. If necessary, the bot can obtain or negotiate other required approvals, such as a homeowners association. The property management server can be authorized by the owner to effect a maintenance request with a maintenance provider without having to seek approval from the owner.

In this case, the owner can provide the bot of the property management server with a budget under with which the bot can operate. The bot can independently collect estimates from providers, research their online reviews and ratings (which can include social media reviews from the owner's connections on social media), create a priority of the exterior painting maintenance task based on the condition, compare the task versus other tasks, assess versus remaining budget, and make an independent decision to schedule the maintenance provider to do the work. The bot can report out to the owner the result of the analysis and the scheduled task completion.

The bot in the property management server can proactively identify revenue opportunities for the property. For instance, it can identify a predicted future surplus of solar power generated by the property and it can independently negotiate the sale of the surplus or can suggest it to the owner of the property. This recommendation can include the bot researching data via a network such as the internet that indicates the forecast market value of energy. Likewise, the bot can identify from its asset data that a garage has no usage (via a motion sensor), and the bot can recommend renting that space asset. Or it may independently do so, if authorized by the property owner.

It should also be noted that an artificial intelligence (AI) component can facilitate automating one or more features in accordance with the disclosed aspects. A memory and a processor as well as other components can include functionality with regard to the figures. The disclosed aspects in connection with automated property management can employ various AI-based schemes for carrying out various aspects thereof. For example, a process for detecting one or more trigger events, reducing a vendor query as a result of the one or more trigger events, and modifying one or more reported measurements, and so forth, can be facilitated with an example automatic classifier system and process. In another example, a process for penalizing one query while preferring another query can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying an a vendor request to be output, modifying one or more reported measurements, and so forth. The criteria can include, but is not limited to, predefined values, frequency attenuation tables or other parameters, service provider preferences and/or policies, and so on.

In one embodiment, described herein is a method comprising receiving, by a server device comprising a processor, from a wireless device, a first signal associated with object identification data representative of an identification of an object associated with a building. The method can comprise receiving, by the server device, a second signal from a wireless device, the second signal associated with sensor data representative of a sensed characteristic of the object. In response to a condition associated with the sensed characteristic being determined to have been satisfied, the method can comprise generating, by the server device, maintenance data representative of a maintenance to be performed on the object. Furthermore, in response to the generating the maintenance data, the method can comprise sending, by the server device to a mobile device via a wireless network, a third signal associated with request data representative of a request for the maintenance to be performed on the object.

According to another embodiment, a system can facilitate receiving object identification data representative of an identification of an object associated with real property. The system can comprise receiving sensor data representative of a sensed characteristic of the object. In response to the receiving sensor data, the system can comprise generating prediction data representative of a predicted maintenance to be performed on the object. In response to the generating the prediction data, the system can comprise sending request data, representative of a request for the predicted maintenance to be performed on the object, to a mobile device.

According to yet another embodiment, described herein is a machine-readable medium that can perform the operations comprising receiving component identification data representative of an identification of a component associated with a building. The machine-readable medium can perform the operations comprising receiving sensor data representative of a sensed characteristic of the component. In response to the receiving sensor data, the machine-readable medium can perform the operations comprising generating prediction data representative of a predicted maintenance to be performed on the component. Additionally, in response to the generating the prediction data, the machine-readable medium can perform the operations comprising sending quote request data, representative of a quote request for the predicted maintenance to be performed on the component, to a mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
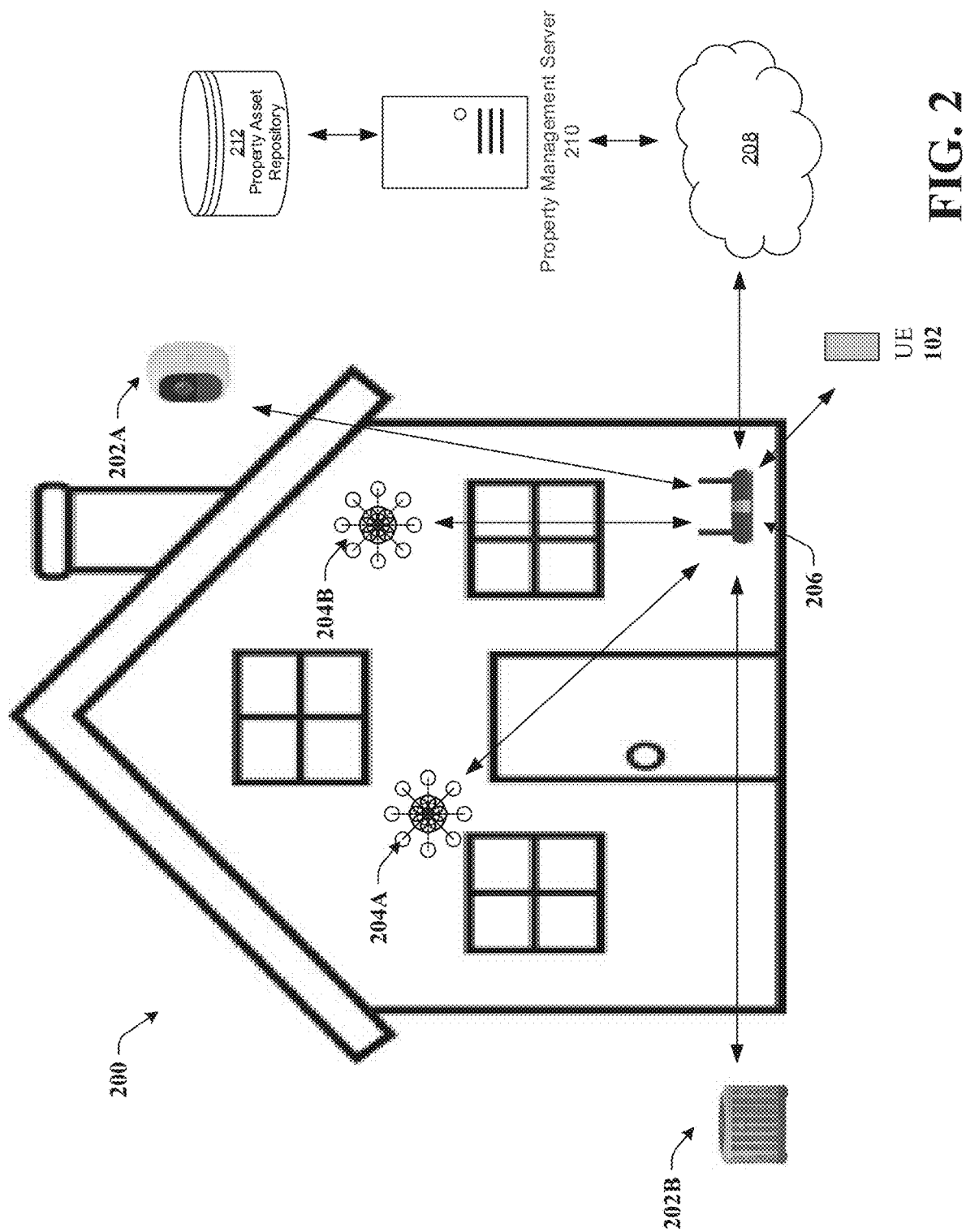
FIG. 2 illustrates an example schematic system block diagram of a property management system according to one or more embodiments.

Referring now to FIG. 2, illustrated is an example schematic system block diagram of a property management system according to one or more embodiments.

The property's environment can be considered to be an asset, and environmental assets data can include data from sensors such as sensors 204A, 204B (e.g., humidity sensors, air flow sensors, motion sensors, light sensors, etc.). The property management server 210 can use data associated with the assets and other complementary data to employ data analysis and artificial intelligence techniques to manage the property. The property management server 210 and asset data can reside locally, or be accessed via a cloud-based network 208, that can be connected to the Internet via router 206.

The condition of the asset can be based on data that the asset records itself or that is collected by a sensor 204A, 204B associated with the asset. For instance, a roof can be monitored by a camera 202A and the images captured can be sent to the property management server 210 for analysis using AI techniques to predict the condition of the roof (e.g., by detecting an indentation in a shingle, damage can be recorded).

Semi-fixed physical assets 202B can include assets such as HVAC units, water heaters, generators, garage door openers. For these assets, data can include: original date (date of installation), maintenance record (input by owner or service technician), current condition, historic condition, predicted future condition, value, usage, and/or predicted maintenance due date. The aforementioned data and the condition of the asset can be based on data that the asset records itself or that is collected by a sensor 204A, 204B and sent to a property asset repository 212. The condition of the environment within the property can be represented as assets. For instance, air quality data, humidity data, air flow data, etc. can be represented. For these assets, data can include: current sensor levels, historic sensor levels, and/or predicted future sensor levels. Alternatively, or in addition, this data can be used to determine trends on the condition of other assets and predict future conditions via the property management server 210. Additionally, the property management server 210 can calculate a surplus amount of the utility (if any) on a periodic basis and can further predict future surplus levels using owner usage trends, and other factors such as predicted environmental factors.

Figure 3:
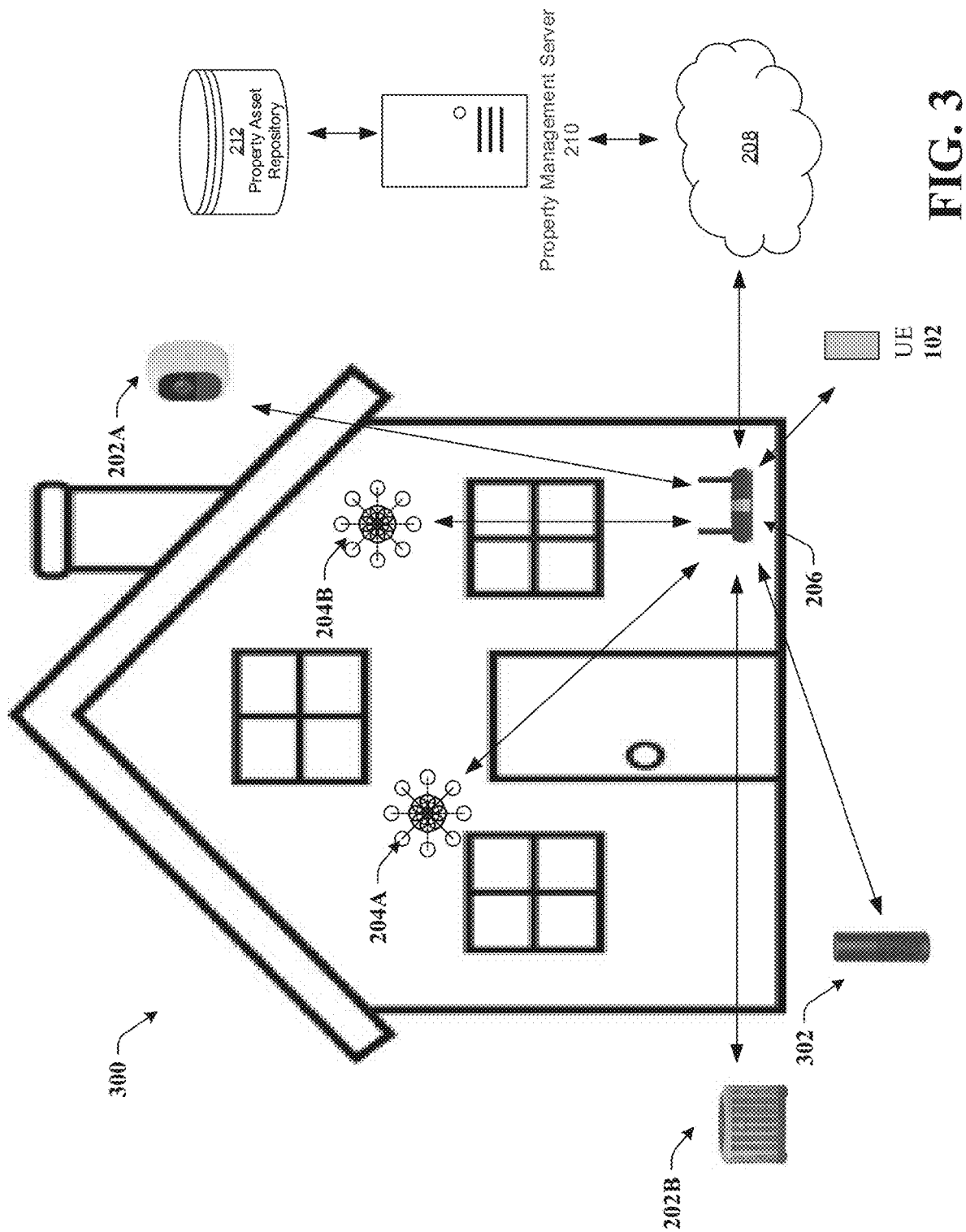
FIG. 3 illustrates an example schematic system block diagram of a property management system comprising a virtual assistant according to one or more embodiments.
Figure 4:
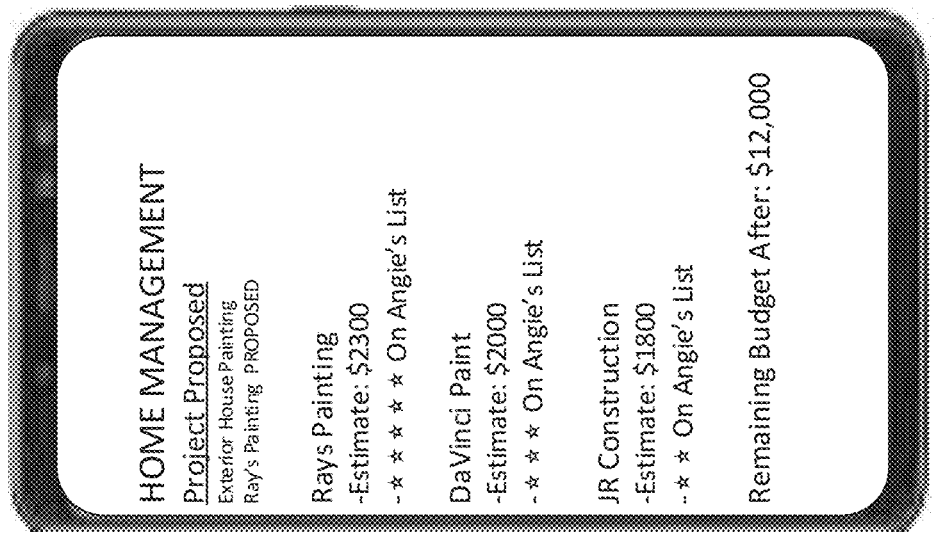
FIG. 4 illustrates an example schematic system block diagram of a UE display screen according to one or more embodiments.
Figure 5:
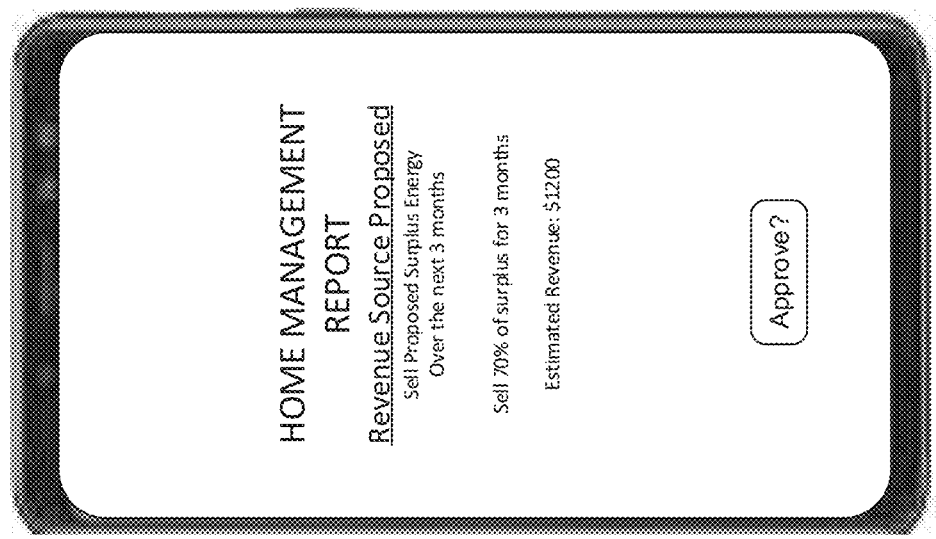
FIG. 5 illustrates an example schematic system block diagram of a UE display screen according to one or more embodiments.

Referring now to FIG. 3-FIG. 5, illustrated are example schematic system block diagram of a property management system comprising a virtual assistant according to one or more embodiments.

The property management server 210 can be delegated by the owner to have oversight of identifying maintenance needs for the house. This delegation can be farmed out to a virtual assistant device 302. In this case, for instance, a fixed asset can be the house's painted exterior. An exterior camera 202A can record chipped paint and the property management server 210 can detect it via image analysis and comparison of prior images. The property management server 210 can use the predicted maintenance due date for repainting to create a maintenance task. The property management server 210 can also include a bot that can act on behalf of the owner to seek and collect maintenance estimates over a network, such as the internet. The results for this and other identified maintenance tasks can be collected and presented to the owner as depicted in FIG. 4 and FIG. 5. The owner can then "approve" tasks, and the bot can schedule them with the maintenance providers. If necessary, the bot can obtain or negotiate other required approvals, such as a homeowner's association approvals, contractual approvals, etc. The property management server 210 can be authorized by the owner to issue a maintenance request with a maintenance provider without having to seek approval from the owner.

In this case, the owner can provide (via the UE 102) the bot of the property management server 210 with a budget under with which the bot can operate. The bot can independently collect estimates from providers via cloud-based network 208, research their online reviews and ratings (which can include social media reviews from the owner's connections on social media), create a priority of the exterior painting maintenance task based on the condition, compare the task versus other tasks, assess versus remaining budget, and make an independent decision to schedule the maintenance provider to do the work as depicted via the owners UE 102 display screen in FIG. 4. The bot can report out to the owner the result of the analysis and the scheduled task completion.

Additionally, the bot of the property management server 210 can proactively identify revenue opportunities for the property. For instance, it can identify a predicted future surplus of solar power generated by the property (after receiving solar panel sensor data representative of power generation) and it can independently negotiate the sale of the surplus or can suggest it to the owner of the property as depicted in FIG. 5. This recommendation can include the bot researching data via a network such as the internet that indicates the forecast market value of energy.

Figure 6:
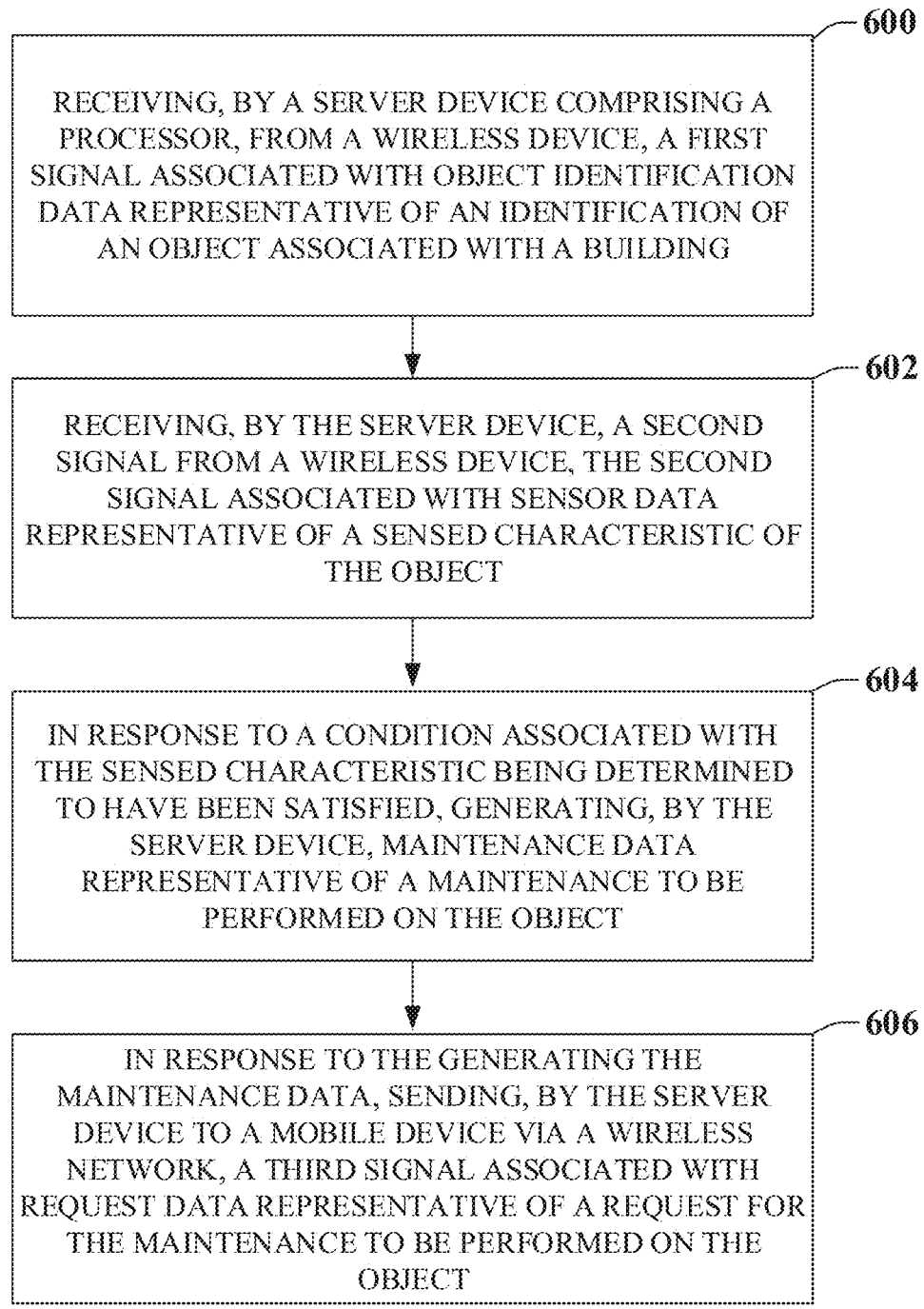
FIG. 6 illustrates an example flow diagram for a method for facilitation of automated property management according to one or more embodiments.

Referring now to FIG. 6, illustrated is an example flow diagram for a method for facilitation of automated property management according to one or more embodiments. At element 600, the method can comprise receiving, by a server device comprising a processor, from a wireless device, a first signal associated with object identification data representative of an identification of an object associated with a building. At element 602, the method can comprise receiving, by the server device, a second signal from a wireless device, the second signal associated with sensor data representative of a sensed characteristic of the object. In response to a condition associated with the sensed characteristic being determined to have been satisfied, at element 604, the method can comprise generating, by the server device, maintenance data representative of a maintenance to be performed on the object. Furthermore, at element 606, in response to the generating the maintenance data, the method can comprise sending, by the server device to a mobile device via a wireless network, a third signal associated with request data representative of a request for the maintenance to be performed on the object.

Figure 7:
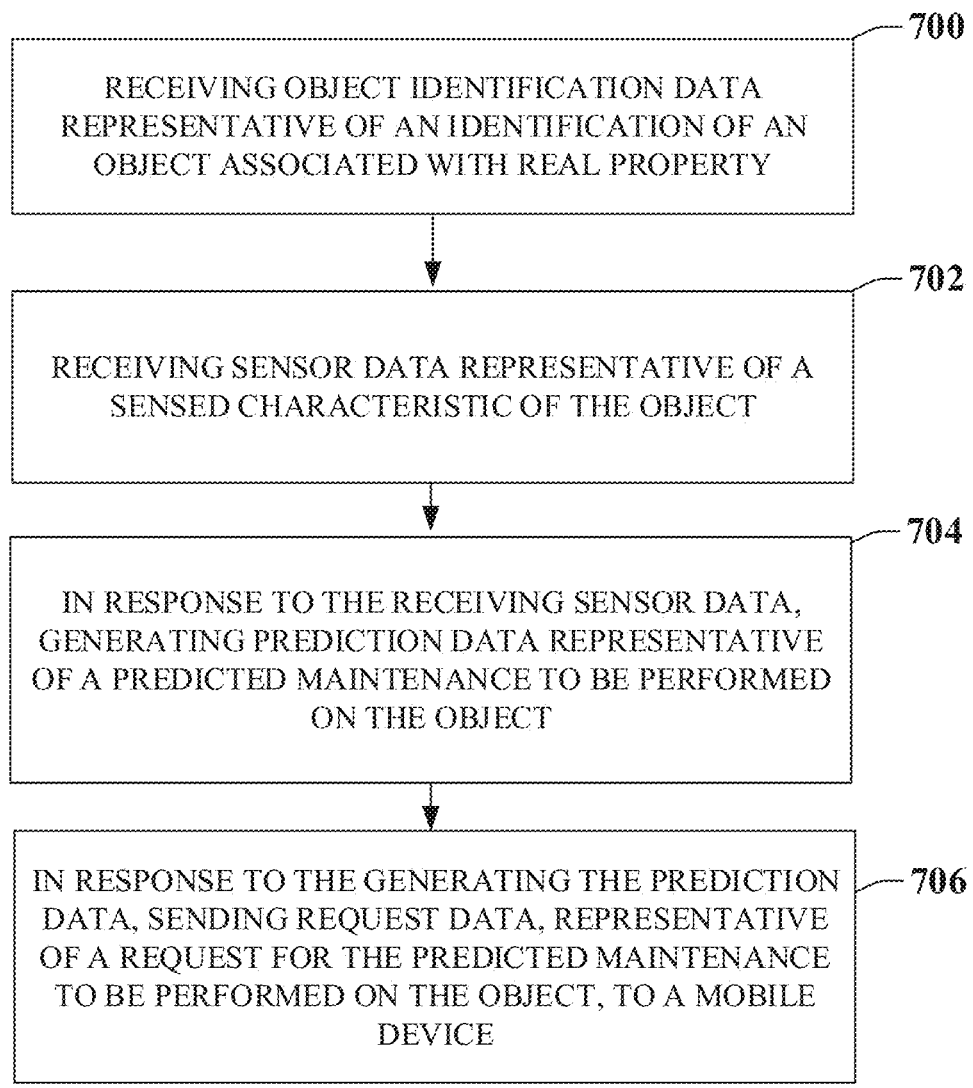
FIG. 7 illustrates an example flow diagram for a system for facilitation of automated property management according to one or more embodiments.

Referring now to FIG. 7, illustrated is an example flow diagram for a system for facilitation of automated property management according to one or more embodiments. At element 700, the system can facilitate receiving object identification data representative of an identification of an object associated with real property. At element 702, the system can comprise receiving sensor data representative of a sensed characteristic of the object. In response to the receiving sensor data, at element 704, the system can comprise generating prediction data representative of a predicted maintenance to be performed on the object. In response to the generating the prediction data, at element 706, the system can comprise sending request data, representative of a request for the predicted maintenance to be performed on the object, to a mobile device.

Figure 8:
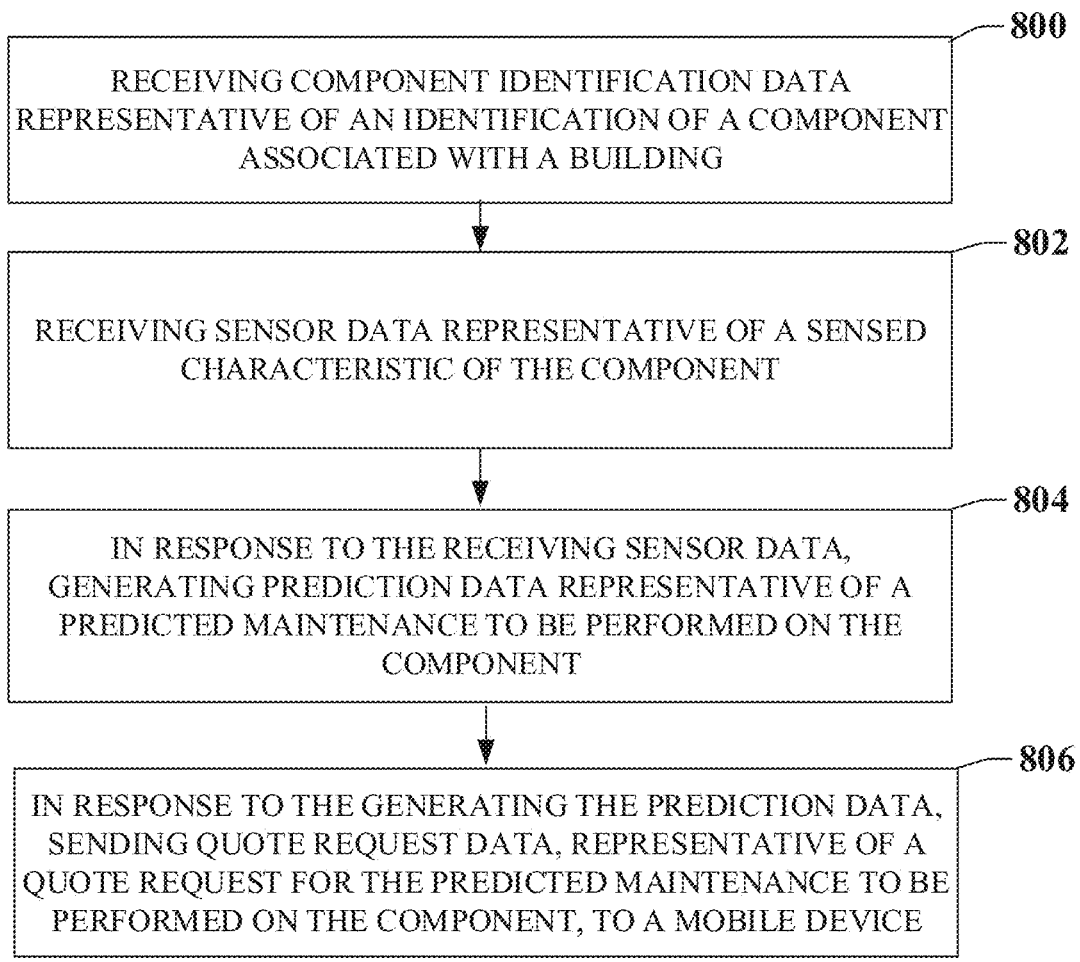
FIG. 8 illustrates an example flow diagram for a machine-readable medium for facilitation of automated property management according to one or more embodiments.

Referring now to FIG. 8, illustrated is an example flow diagram for a machine-readable medium for facilitation of automated property management according to one or more embodiments. At element 800, the machine-readable medium can perform the operations comprising receiving component identification data representative of an identification of a component associated with a building. At element 802, the machine-readable medium can perform the operations comprising receiving sensor data representative of a sensed characteristic of the component. In response to the receiving sensor data, at element 804, the machine-readable medium can perform the operations comprising generating prediction data representative of a predicted maintenance to be performed on the component. Additionally, in response to the generating the prediction data, at element 806, the machine-readable medium can perform the operations comprising sending quote request data, representative of a quote request for the predicted maintenance to be performed on the component, to a mobile device.

Figure 9:
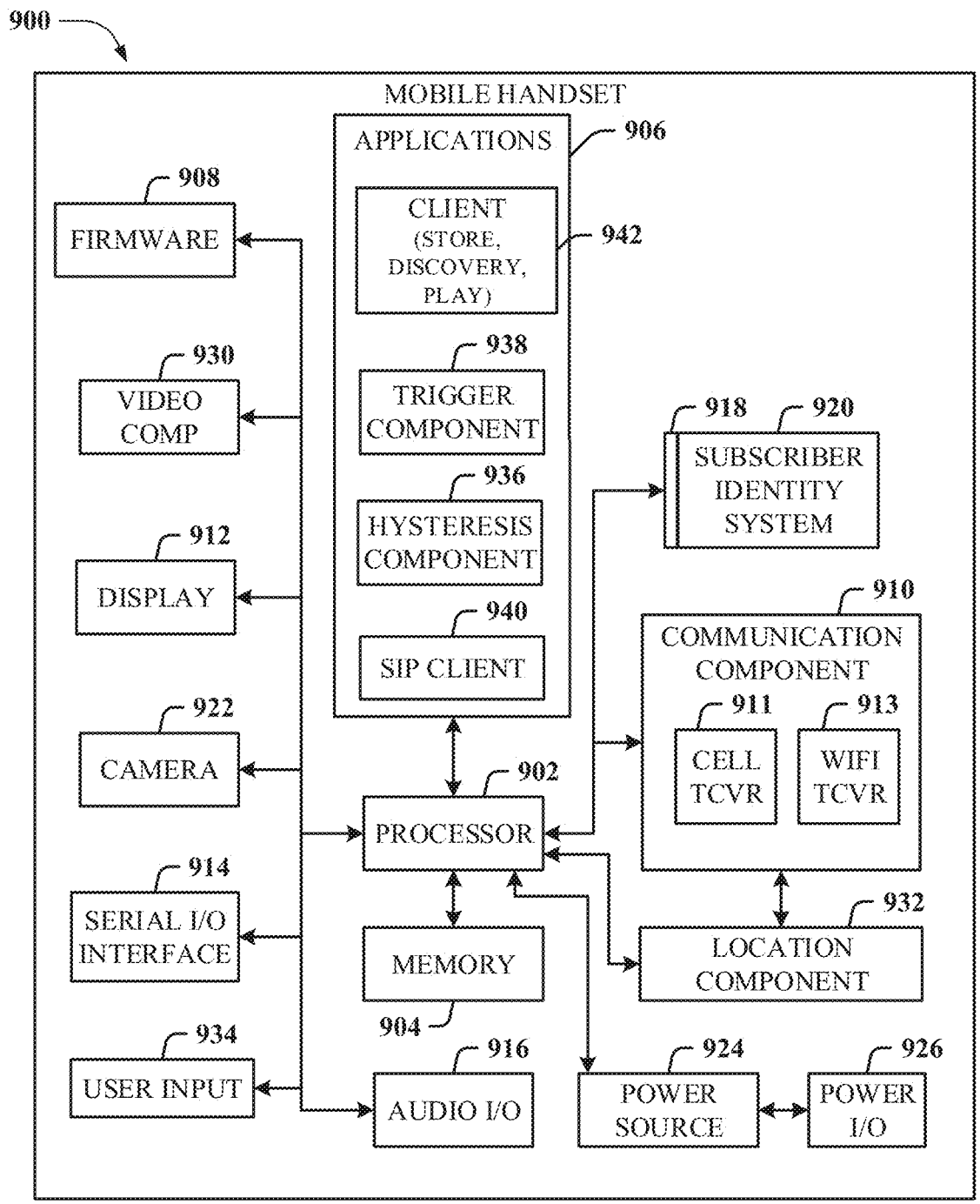
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations. It should be noted that the microphone can be a digital or a non-digital microphone. For example, if the microphone is digital, it can produce audio data, however, the microphone can be non-digital and produce an audio signal that can be digitized by an analog-to-digital converter to produce the outputs for facilitation of the scenarios outlined in this disclosure.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
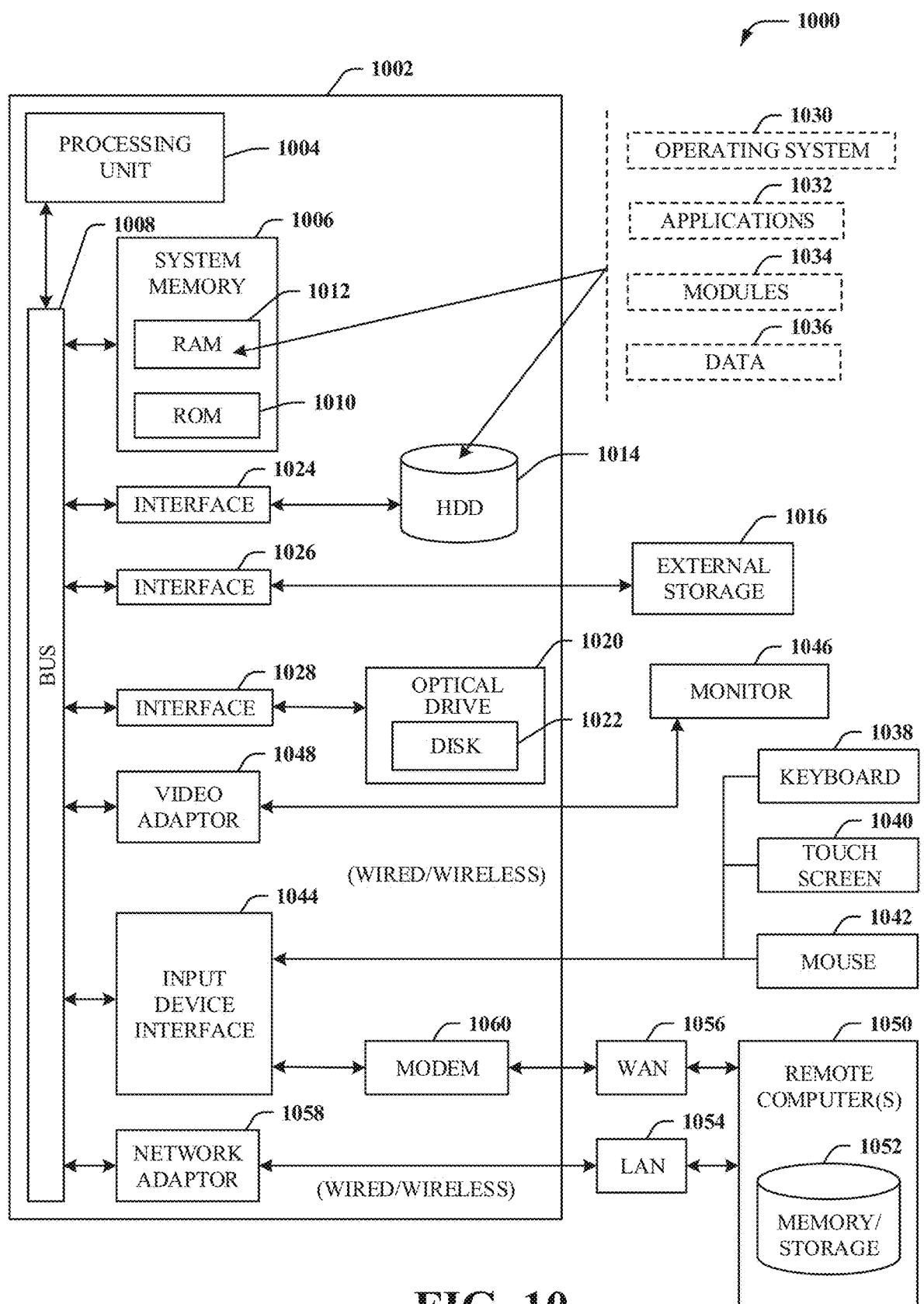
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    training, by a server device comprising a processor, an artificial intelligence model to predict future conditions of objects associated with buildings;
    receiving, by the server device, from a wireless device, a first signal associated with object identification data representative of an identification of an object associated with a building;
    receiving, by the server device, a second signal from the wireless device, the second signal associated with sensor data representative of a sensed characteristic of the object;
    predicting, by the server device, via the artificial intelligence model, a future condition of the object based on the sensed characteristic of the object;
    in response to determining that the future condition associated with the sensed characteristic satisfies a criterion, generating, by the server device, maintenance data representative of a maintenance to be performed on the object to prevent the future condition; and
    in response to the generating the maintenance data:
        activating, by the server device, a bot program that negotiates with a homeowners association associated with the building to obtain an approval to perform the maintenance, and
        sending, by the server device to a mobile device via a wireless network, a third signal associated with request data representative of a request for the maintenance to be performed on the object.

2. The method of claim 1, wherein the object identification data further comprises identification of damage to the building.

3. The method of claim 2, wherein the sensed characteristic is received from a video camera device, and wherein the sensed characteristic comprises an indication of the damage to the building.

4. The method of claim 1, wherein the criterion is a threshold amount of damage to the building.

5. The method of claim 2, wherein the request data further comprises a request to repair the damage to the building.

6. The method of claim 5, wherein the mobile device is a first mobile device associated with a first user identity, and further comprising:
    sending, by the server device, a fourth signal via the wireless network, representative of the request data, to a second mobile device associated with a second user identity to repair the damage to the building.

7. The method of claim 6, wherein the first user identity is associated with an owner of the building.

8. A system, comprising:
    a processor; and
    a memory that stores executable instructions that, when executed by the processor, facilitate performance of operations, comprising:
        training a neural network model to predict future conditions of objects associated with real properties;
        receiving object identification data representative of an identification of an object associated with real property;
        receiving sensor data representative of a sensed characteristic of the object;
        predicting, using the neural network model, a future condition of the object based on the sensed characteristic of the object;
        in response to the future condition associated with the sensed characteristic being determined to have satisfied a criterion, generating, via the neural network model, maintenance data representative of a predicted maintenance to be performed on the object to prevent the future condition;
        initiating a bot program that negotiates with a property owners association associated with the real property to acquire an authorization to perform the predicted maintenance; and
        sending request data, representative of a request for the predicted maintenance to be performed on the object, to a mobile device.

9. The system of claim 8, wherein the operations further comprise:
    in response to sending the request data to the mobile device, receiving confirmation data representative of a confirmation to proceed with a maintenance request.

10. The system of claim 9, wherein the mobile device is a first mobile device, and wherein the operations further comprise:
    based on the confirmation data, generating maintenance order data representative of a maintenance order to be sent to a second mobile device.

11. The system of claim 10, wherein the operations further comprise:
    in response to generating the maintenance order data, sending the maintenance order data to the second mobile device.

12. The system of claim 11, wherein the confirmation is a first confirmation, wherein the confirmation data is first confirmation data, and wherein the operations further comprise:
    in response to sending the maintenance order data to the second mobile device, receiving, from the second mobile device, second confirmation data representative of a second confirmation to perform the predicted maintenance on the object.

13. The system of claim 12, wherein the operations further comprise:

in response to receiving the second confirmation data, sending the second confirmation data to the first mobile device.

14. The system of claim 12, wherein the operations further comprise:
in response to receiving the second confirmation data, sending the second confirmation data to a third mobile device associated with a user identity, wherein the user identity is associated with an owner of the real property.

15. A non-transitory machine-readable medium, comprising executable instructions that, when executed by a processor, facilitate performance of operations, comprising:
training an artificial intelligence model to predict future conditions of components associated with buildings;
receiving component identification data representative of an identification of a component associated with a building;
receiving sensor data representative of a sensed characteristic of the component;
predicting, via the artificial intelligence model, a future condition of the component based on the sensed characteristic of the component;
in response to the future condition associated with the sensed characteristic being determined to have satisfied a criterion, generating, via the artificial intelligence model, maintenance data representative of a predicted maintenance to be performed on the component to prevent the future condition;
executing a bot program that negotiates with an owners association associated with the building to obtain approval to perform the predicted maintenance; and
sending quote request data, representative of a quote request for the predicted maintenance to be performed on the component, to a mobile device.

16. The non-transitory machine-readable medium of claim 15, wherein the operations further comprise:
receiving budget data, representative of a budget, to be applied to a quote for the predicted maintenance.

17. The non-transitory machine-readable medium of claim 16, wherein the operations further comprise:
in response to the sending the quote request data to the mobile device, receiving quote data representative of the quote for the predicted maintenance from a second mobile device.

18. The non-transitory machine-readable medium of claim 17, wherein the operations further comprise:
in response to receiving the budget data and the quote data, comparing the budget data to the quote data.

19. The non-transitory machine-readable medium of claim 18, wherein the quote request is a first quote request, and wherein the operations further comprise:
in response to a condition associated with a quote value being determined to be greater than a budget value, generating a second quote request.

20. The non-transitory machine-readable medium of claim 19, wherein the operations further comprise:
in response to generating the second quote request, sending the second quote request to a third mobile device.

* * * * *